Patented Aug. 16, 1949

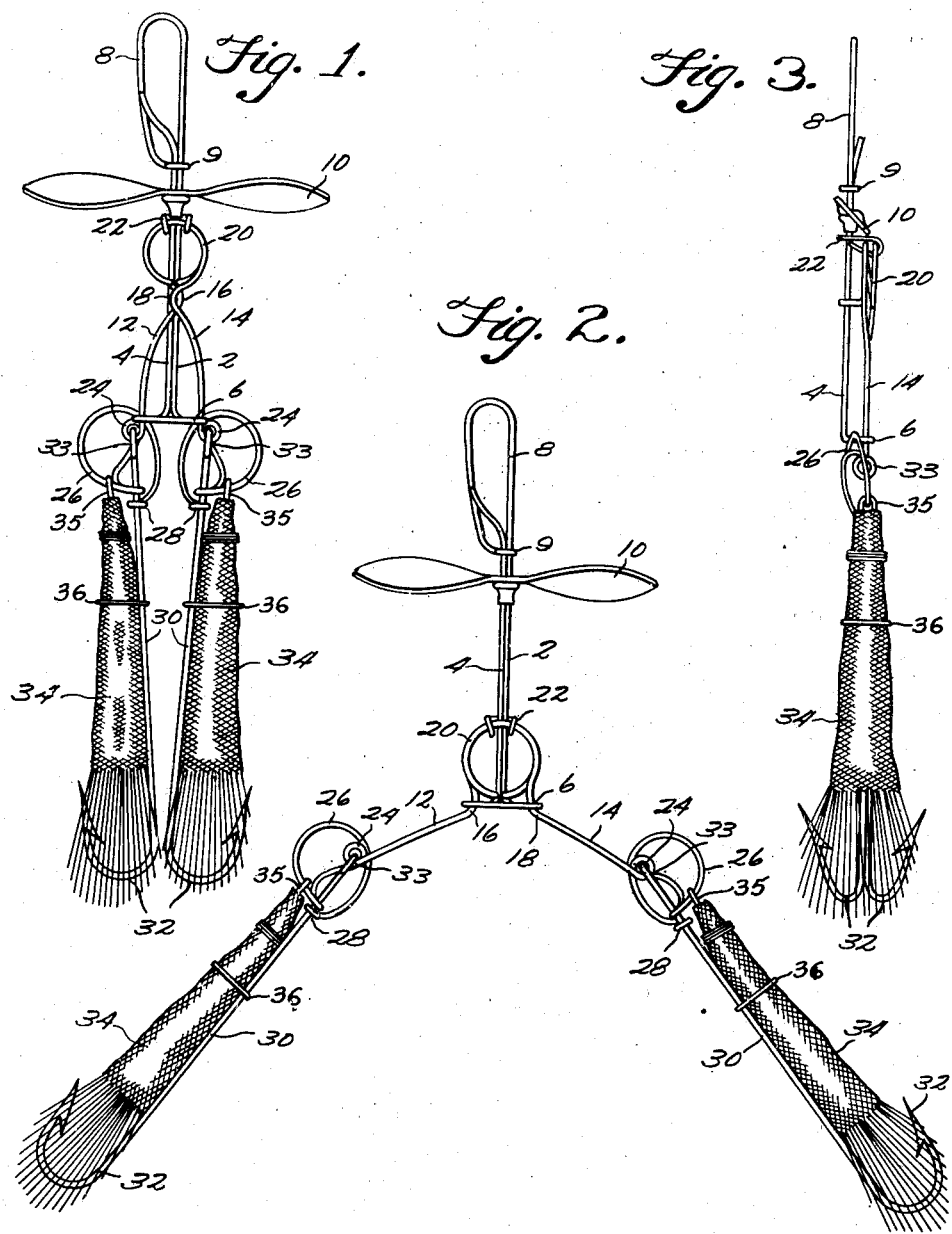

2,479,484

UNITED STATES PATENT OFFICE 2,479,484

CASTING AND FISHING MECHANISM

Emil Fornas, Ashtabula, Ohio

Application November 8, 1946, Serial No. 708,491

1 Claim. (Cl. 43—36)

My present invention relates to an improved casting and fishing mechanism and comprises generally a pair of spring mounted hooks together with means for detachably securing the hook in spring condition until a fish strikes either hook whereupon the release means will function embedding the hook in the mouth of the fish.

Novel means are also employed to prevent opening of the hooks during casting or trolling.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a plan view of the device of my invention in closed or set position.

Fig. 2 is a similar view in open position.

Fig. 3 is a side elevational view in set position.

Referrng now to the drawings wherein like characters indicate like parts, I have illustrated the present embodiment of my invention as comprising a wire shank 2 having a bent parallel portion 4 having a lower elongated loop 6 therebetween, the shank terminating upwardly in a clamp 8 formed with a hook 9 engaging the portion 4 and the shank. A leader may be attached to the clamp loop, and a spinner 10 is journaled on the shank and the parallel portion.

The arms 12 and 14 of spring wire are bent at 16 and 18 respectively and connected with a spring coil 20 which is slidably secured to the shank 2 and portion 4 by a clip 22.

Eyes 24 are formed adjacent the ends of the arms 12 and 14 and then extend to form loops 26 which have extensions forming guide coils 28 which receive the shank 30 of fish hook 32 secured to the eyes 24 by loops 33. Feather or other suitable ornamentation 34 disguises the hook. Each feather 34 is provided with a conventional eye 35 which is received on the loop 26 and a suitable fastening means 36 secures the feather 34 to the shank 30.

For casting or trolling the arms 16 and 18 are compressed and slid up through the loop 6 to the position of Figs. 1 and 3. However when a fish strikes either hook, pulling backward against the forward direction of movement, the arms 12 and 14 will be pulled through the loop, speeding sharply under the tension of the compressed arms and imbedding the hook in the mouth of the fish.

When the device is used for casting and trolling the spinner 10 is retained as shown in the figures. However, the device can be used for bait fishing by removing the spinner 10, the hooks can be detached so that hooks having long or short shanks may be used as desired. Thus hooks adaptable to the size of the fish being sought can be used.

From the above description it will be apparent that the mechanism of my invention will be efficient and automatic in operation and will snare the hooked fish to prevent his getting away.

Having thus fully described my invention what I claim as new and desire to secure by Letters Patent is:

A fishing mechanism as described including a looped shank for attachment to a leader, an elongated loop at the rear of the shank, spring arms in the loop slidably secured to the shank compressible within the loop, and eyes adjacent the ends of the arms for connecting fish hooks on the arms whereby the strike of a fish will withdraw the compressed arms and spring the hooks outwardly.

EMIL FORNAS.

REFERENCES CITED

The following references are of record in the file of this patent:

UNITED STATES PATENTS

| Number | Name | Date |
| --- | --- | --- |
| 321,796 | Clark | July 7, 1885 |
| 614,424 | Evans | Nov. 15, 1898 |
| 825,639 | Curtis | July 10, 1906 |
| 1,710,102 | Moore | Apr. 23, 1929 |